United States Patent [19]

Kraus et al.

[11] Patent Number: 5,002,243
[45] Date of Patent: Mar. 26, 1991

[54] PLASTIC HOLDING DEVICE WITH NOISE DAMPENING

[75] Inventors: Willibald Kraus, Grunstadt; Rückwardt Hans-Werner, Eisenberg, both of Fed. Rep. of Germany

[73] Assignee: TRW United Carr GMBH & Co. KG, Enkenbach-Alsenborn, Fed. Rep. of Germany

[21] Appl. No.: 470,152

[22] Filed: Jan. 25, 1990

[51] Int. Cl.[5] ................................................ F16L 3/08
[52] U.S. Cl. ..................................... 248/68.1; 248/73; 248/74.2
[58] Field of Search .................. 248/68.1, 71, 73, 74.1, 248/74.2, 74.4, 74.3, 62, 63

[56] References Cited

U.S. PATENT DOCUMENTS

| | | | |
|---|---|---|---|
| 3,387,343 | 6/1968 | Fritz-Gerald | 248/68.1 X |
| 3,934,802 | 1/1976 | Jennings | 248/71 |
| 3,944,177 | 3/1976 | Yoda | 248/74.2 |
| 4,600,174 | 7/1986 | Gosse et al. | 248/73 X |
| 4,655,423 | 4/1987 | Schavilje et al. | 248/71 |
| 4,717,100 | 1/1988 | Klein | 248/74.1 X |
| 4,905,942 | 3/1990 | Moretti | 248/73 X |

FOREIGN PATENT DOCUMENTS

| | | | |
|---|---|---|---|
| 3236983 | 4/1984 | Fed. Rep. of Germany | 248/68.1 |
| 465687 | 1/1969 | Switzerland | 248/68.1 |

Primary Examiner—Alvin C. Chin-Shue
Attorney, Agent, or Firm—Fay, Sharpe, Beall, Fagan, Minnich & McKee

[57] ABSTRACT

The invention relates to a plastic holding device 1 comprising an outer shell 2 of harder material to be fastened on a support 4, and an inner shell 3 of softer material set therein. The holding element 1 is provided with at least one holding or bearing point, 10 to 13, for the reception of a tubular part, 6 to 9. According to the invention, the outer shell 2 has an open zone 15 adjacent to the support 4 and into which is received the softer inner shell 2 provided with the bearing points 10 to 13. The inner shell projects beyond the outer shell in the unmounted condition and engages the support 4 when the device is mounted to provide noise and vibration dampening for the assembly.

9 Claims, 1 Drawing Sheet

PLASTIC HOLDING DEVICE WITH NOISE DAMPENING

BACKGROUND OF THE INVENTION

The subject invention relates to a holding device formed of plastic with an outer shell of a relatively hard material adapted to be fastened to a support and an inner shell of a relatively softer material adapted to be received in the outer shell. The holding device is provided with at least one bearing point or section for receiving and holding a tubular component such as a pipe or cable.

As state of the art, a holding device is already known which is comprised of three parts: a harder outer shell, a softer inner shell, and a closing cover which closes the whole unit after the inner shell is set into the outer shell. (See for example, U.S. Pat. No. 4,347,998). This known arrangement is used to receive and hold electric lines, pipelines and similar tubular structures. Because of its construction, it is not noise-dampening. Therefore, its range of use is limited.

Other holding devices are known in the prior art which, in each case, comprise an inner shell of elastic material which is enclosed by a harder outer shell consisting of sheet metal. The outer shell is, in turn, used for fastening the assembly to a support member or surface. (See for example, German Disclosures 2,162,662 and 1,650,019). Other known state of the art constructions are disclosed wherein a part comprised of plastic and enclosed by a sheet metal covering is used to receive pipelines. (See British Patent 1,403,714) A pipe support is also known which consists of three parts, namely two semi-circular elements forming an outer shell and a narrow ring which serves as an inner shell. (See German Disclosure 2,814,718) Also belonging to the state of the art is an insulating and holding device for lines as shown in German Published Application 1,108,526. It is common to all these prior constructions that their designs do not allow effective noise damping in the zone of support for tubular parts.

BRIEF STATEMENT OF THE INVENTION

Accordingly, the purpose of the present invention is to provide a holding element of the kind mentioned which is simple to install and which provides very good noise-damping of the tubular parts to be held.

According to the invention, the problem of ineffective noise dampening is solved by the fact that the harder outer shell has an open zone which opens toward the support. The inner shell is received in this open zone and is provided with bearing zones or surfaces which project beyond the outer shell in the unmounted condition. In this way, the advantage produced is that a simple mounting takes place since the tubular parts can be simply pressed into the holding zone while, after carrying out the mounting, the projection surfaces or zones of the inner shell securely enclose the tubular parts as a whole. Moreover, the arrangement produces an additional intervening resilient material between the outer shell and the support, so that very effective sound damping is provided. Because the soft material of the inner shell is pressed against the support, the open zones to the bearing or holding zones for the tubular parts are closed and, through the pressing together of the components, the tubular parts are supported with sound and vibration damping.

In a further development of the invention, the inner shell and outer shell are connected with each other through resilient catch elements. The outer shell may be made in a U-shape with at least one opening into which a catch element carried on the inner shell can be received. Preferably, the outer shell may be provided with two openings lying opposite each other, and the inner shell can be formed with two catch elements arranged to engage the two openings.

In further development of the invention, the inner shell may have openings passing through it and/or be divided by intermediate walls in the zone of at least one of the bearing points. As a consequence, an elastic behavior of the inner shell is produced which contributes to the improvement in regard to noise damping.

According to another feature of the invention, the outer shell may have on its outer circumference at least one reinforcing rib. Through this reinforcing or stiffening rib there is assured a protection against impacts from stone or other hazards.

If several tubular parts are to be supported, the inner shell may have bearing points to receive the corresponding tubular parts located on both sides of the middle zone in which the catch elements and a cylindrical opening are arranged. In this arrangement the bearing parts may advantageously be designed to receive tubular parts of different diameters. To simplify mounting, the bearing points may in each case be designed as elongated holes with a narrowed and chamfered push-in zone.

In a further development of the invention, the U-shaped walls of the outer shell may be provided with offset openings on the bearing points of the inner shell, with entrance chamfers. In this way, the mounting of the tubular parts is facilitated.

In order to fasten the whole unit securely to a support, a further development of the invention proposes that the middle zone of the outer shell may include a fastening element intended to be joined with the support. This fastening element may be designed as a bolt-like member having a blind hole and connected through a frangible membrane with the bottom of the outer shell to project in the unmounted condition through the bottom of the outer shell. The inner circumference of the blind hole is designed for joining to a threaded stud or the like and may be either smooth or provided with ribs or threads. The bolt-like member may also have a head supported in the mounted condition in an opening on the bottom of the outer shell. Thus, it is possible to fasten the assembly comprised of the inner shell and outer shell, quickly, simply and securely, to a part of the support provided with a corresponding profiled bolt or stud. Since the bolt-like member is fastened through a frangible membrane to the bottom of the outer shell, it is secured against being lost.

BRIEF DESCRIPTION OF THE DRAWINGS

The invention will be described in detail below in conjunction with a preferred embodiment shown in the accompanying drawings wherein.

DETAILED DESCRIPTION OF THE PREFERRED EMBODIMENT

Figure 1:
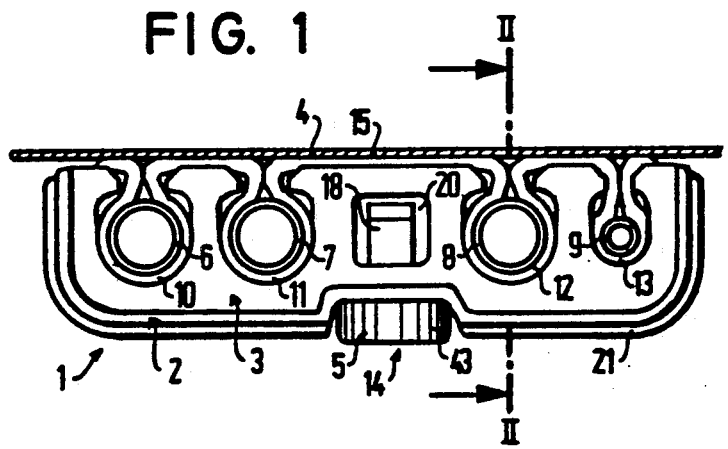
FIG. 1 is a side view of the plastic holding device after fastening to a support.

Referring more particularly to the drawings wherein the showings are for the purpose of illustrating a preferred embodiment of the invention only, and not for the purpose of limiting same, FIG. 1 shows a plastic holding device 1 fastened to a support 4 and comprised of an outer shell 2 of harder plastic material and an inner shell 3 set therein formed of softer and more resilient plastic material than outer shell 2. The inner shell 3 is provided with several connecting points or bearing points or zones 10, 11, 12, and 13 adapted to receive and hold tubular parts 6, 7, 8 and 9. Tubular parts 6 through 9 can be tubes, pipes, electric cables or the like. In the middle zone 14, the assembly of outer shell 2 and inner shell 3, is fastened through a fastening element 5 to a support 4. Support 4 is illustrated as a metal panel but it should be understood that it can be substantially any type of frame or associated structure to which it is desired to join the holding element 1.

As can be seen from FIG. 1, the outer shell 2 defines a zone or chamber 15 which opens toward the support 4 and which receives and supports the inner shell 3.

Figure 2:
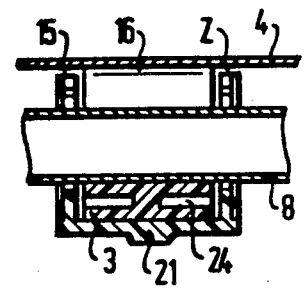
FIG. 2 is a cross-sectional view taken along the line II—II in FIG. 1.

In the unmounted condition (i.e. prior to being joined to the support 4) the inner shell 3 projects substantially outward beyond the outer shell 2. As can be seen from FIGS. 1 and 2, after mounting the inner shell 3, formed of softer and more resilient material than outer shell 2, is pressed against the support 4 so that the tubular parts 6, 7, 8 and 9, are enclosed as far as possible. Meanwhile an interspace z is also present between the upper zone of the outer shell 2 and the opposed surface of the support 4. Thus, the harder and more rigid outer shell 2 does not normally lie directly against the support 4. Rather, the softer inner shell 3 engages the support 4 and, thus, through the cooperation of the above-mentioned elements, a very good noise and vibration damping effect is provided for the pipelines 6, 7, 8 and 9.

Figure 3:
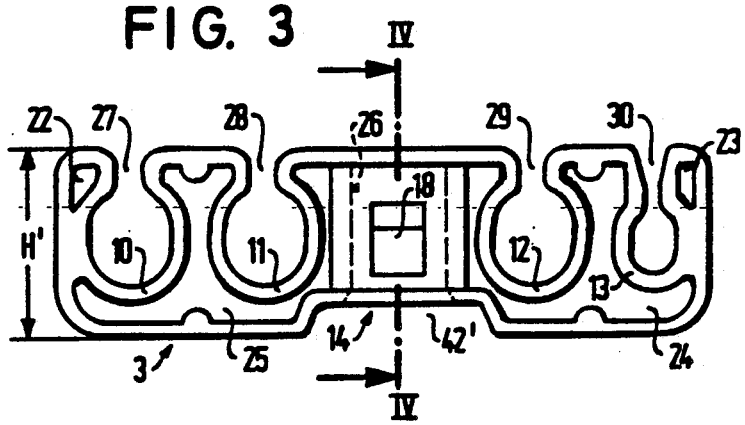
FIG. 3 is a side view of the inner shell of softer material.
Figure 4:
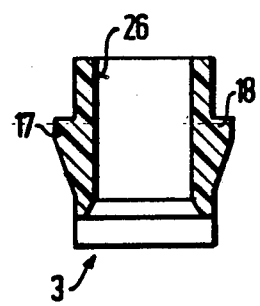
FIG. 4 is a cross-sectional view along the line IV—IV in FIG. 3.

In FIGS. 3 and 4, the softer inner shell 3 is shown in detail. As can be seen, the inner shell has in each case on both sides of the middle zone 14, two bearing points, 10 and 11, and 12 and 13, respectively. These bearing points are designed similar to elongated holes with narrowed push-in zones 27, 28, 29 and 30. Also provided in the zone of the bearing points 10 through 13 are openings or recesses 22 and 23, and 24 and 25 respectively. Here, the openings 22 and 23, may pass completely through, while the openings 24 and 25 may extend only part way through and be equipped with a middle wall, not shown in detail.

In the middle zone 14, the inner shell 3, formed of softer material than outer shell 2, has a cylindrical opening 26, as well as catch elements 17 and 18, lying opposite each other (see FIG. 4).

Figure 5:
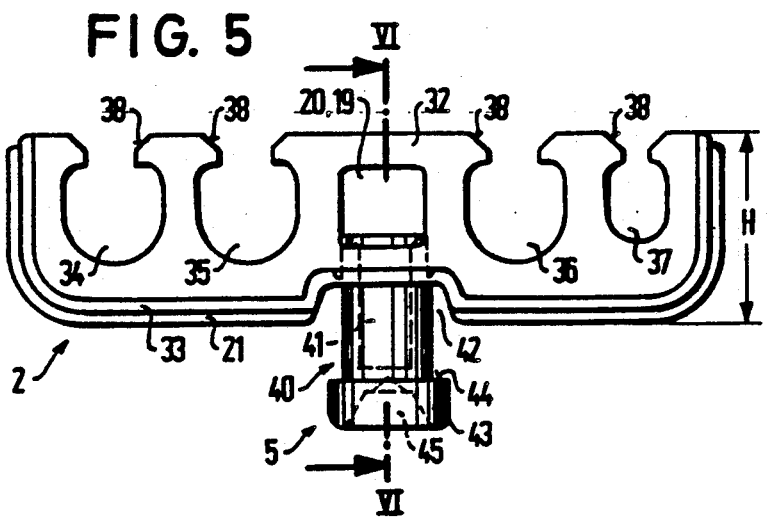
FIG. 5 is a side view of the outer shell of harder material with a bolt formed therewith by injection molding; and, FIG. 6 is a cross-sectional view taken along the line VI—VI in FIG. 5.
Figure 6:
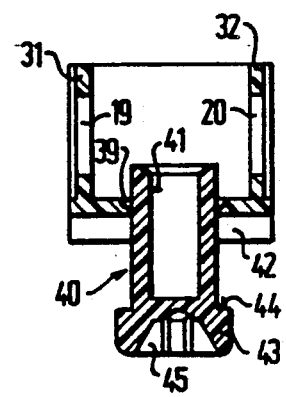

In FIGS. 5 and 6, the outer shell 2, comprised of harder material than inner shell 3, is shown in detail. As can be seen, outer shell 2 has a U-shape with a bottom 33 and oppositely disposed side walls 31 and 32. Openings 19 and 20 are provided in the middle zone of the side walls 31 and 32. The openings 19, 20 are dimensioned so that they cooperate with the catch elements 17 and 18 of the inner shell. As the inner shell 3 is moved into position in the outer shell 2, the catch elements 17 and 18 deflect inwardly toward each other until they are aligned with openings 19, 20. When finally in position, the catch elements 17, 18 latch in the openings 19, 20 to hold the outer shell 2 and inner shell 3 in assembled relationship.

In the middle zone 14 the fastening device is defined by a bolt-like member 40 with a head 43 and a circumferential surface 44. The bolt-like member 40 also includes a central, axially extending blind opening 41 which can be a smooth walled opening or, in the alternative, threaded or provided with ribs or flexible retaining tabs to allow the member 40 to be joined to thread studs or profiled pins extending from support 4. The head 43 is also preferably provided with a tool receiving opening 45 for receiving an Allen wrench, a screw driver or the like. By rotating the bolt-like member 40 it can be driven onto a profiled or threaded stud or pen not shown in detail. Fastening element 5, that is, the bolt-like member 40, is preferably connected through a thin frangible membrane 39 to the bottom of the outer shell 2. This maintains member 40 in a properly associated relationship with the outer shell 2 until the components are joined to the support 4.

It can also be seen from FIGS. 5 and 6 that the bottom wall 33 of the shell 2 has an opening 42 in the middle zone. The opening 42 is similar to an opening 42' in the middle zone of the inner shell 3 (See FIG. 3). Opening 42 is properly dimensioned to receive the head 43 when the holding element is in the mounted condition according to FIG. 1. From FIGS. 2 and 5 it appears, also, that the bottom wall 33 is provided with a reinforcing rib or flange 21 which extends over the whole length of the shell 2 for providing greater strength and protection against stone impacts. The side walls 31 and 32 are, like the bearing zones 10, 11, 12 and 13 of the inner shell 3, provided with openings 34, 35, 36 and 37, which, in each case, have in the upper zone chamfers or bevels 38 to facilitate the mounting of the tubular parts 6, 7, 8 and 9. These chamfers 38 form cams on the sides of the outer wall 2 which have the purpose of holding pre-mounted lines, and holding them in a condition which suitably retains them connected with the holding device prior to connection to the support.

The soft inner shell 3 is set into the U-shaped outer shell 2. And, after mounting, the catch elements 17 and 18 of the inner shell engage in the openings 19 and 20 of the outer shell. With this, the upper zone of the bolt 40 of the outer shell 2 is partly supported in the cylindrical space 26 of the inner shell 3.

During mounting, the pipelines 6, 7, 8, 9 are set into the corresponding bearing or holding points 10, 11, 12 and 13 of the softer inner shell 3. Here, the introduction of the corresponding tubular parts 6, 7, 8, 9 is facilitated by the conically shaped push-in zones 27, 28, 29 and 30 of the soft inner shell 3, and also by the entry chamfers or bevels 38 of the hard outer shell 2. After carrying out this mounting process, the unit, so pre-mounted, is pressed against a suitably profiled pin (not shown in detail) which has previously been fastened to the support 4. Thereafter, the bolt 40, by driving on the bolt head 43, is driven onto the profiled pin. The profiled pin is, of course, supported in the hole 41 of the bolt 40, and the bolt 40 takes the position shown in FIG. 1. In this position, the mounting is ended, since the height H of the outer shell 2 is less than the height H' of the inner shell 3. After carrying out the mounting, the individual tubular parts 6, 7, 8 and 9 are supported simply but in a very effective noise and vibration damped manner. Thus a damped support of lines, which is a great advantage, especially in motor vehicle construction results.

It is now claimed:

1. A plastic holding device for mounting a tubular member to a support and including a first outer shell formed from a hard rigid plastic and a second inner shell having a pair of lateral sidewalls and end walls and formed of a relatively softer more resilient material, said first and second shells cooperating to define at least one holding zone for receiving and holding a tubular member to be mounted to said support, said outer shell having an opening facing said support with said inner shell received in said opening and having support engaging bearing points extending outwardly of said opening beyond said outer shell for engagement with said support, said outer shell having a U-shape and said pair of spaced side walls receiving and enclosing the lateral sides of said inner shell, at least one catch receiving opening arranged in one of said side walls, a resilient catch element carried on the inner shell and extending into said catch receiving opening to retain said inner shell in said outer shell, said inner shell having recesses formed inwardly from its lateral sides adjacent the bearing points to increase the resiliency and vibration reducing characteristics of said holding device, and a bolt-like member extending through said outer shell and said inner shell and biasing said catch element into said opening.

2. A holding device engaging element according to claim 1 wherein the outer shell has at least one reinforcing rib formed on its outer circumference.

3. A holding device according to claim 1 wherein the inner shell has a middle zone in which are arranged the catch elements and a cylindrical fastener receiving opening.

4. A holding device according to claim 1 wherein there are a plurality of holding zones designed to receive tubular parts of different diameter.

5. A holding device according to claim 4 wherein the holding zones comprise holes with a narrowed push-in zone opening toward the support.

6. A holding device according to claim 3 wherein the side walls of said outer shell have chamfered openings leading to said holding zones.

7. A holding device according to claim 1 wherein the bolt-like member is connected to the outer shell through a frangible web and projects in the unmounted condition through the bottom of the outer shell.

8. A holding device according to claim 7 wherein the bolt-like member has an axially extending stud opening.

9. A holding device according to claim 7 wherein the outer shell includes a recess and the bolt-like member includes a head which is received in said recess when said holding element is mounted to said support.

* * * * *